United States Patent [19]

Knecht et al.

[11] Patent Number: 4,773,269
[45] Date of Patent: Sep. 27, 1988

[54] MEDIA ISOLATED DIFFERENTIAL PRESSURE SENSORS

[75] Inventors: Thomas A. Knecht, Eden Prairie; Mark G. Romo, Richfield, both of Minn.

[73] Assignee: Rosemount Inc., Eden Prairie, Minn.

[21] Appl. No.: 891,261

[22] Filed: Jul. 28, 1986

[51] Int. Cl.[4] .................... G01L 7/08; G01L 9/06
[52] U.S. Cl. ....................... 73/706; 73/721; 73/DIG. 4; 338/4
[58] Field of Search ........ 73/706, 708, 721, DIG. 4, 73/727, 720, 726; 338/4

[56] References Cited

U.S. PATENT DOCUMENTS

| | | | |
|---|---|---|---|
| 3,079,576 | 2/1963 | Kooiman | 338/4 |
| 3,739,315 | 6/1973 | Kurtz et al. | 338/3 |
| 4,023,562 | 5/1977 | Hynecek et al. | 128/2.05 E |
| 4,202,217 | 5/1980 | Kurtz et al. | 73/727 |
| 4,208,782 | 6/1980 | Kurtz et al. | 29/580 |
| 4,222,277 | 9/1980 | Kurtz et al. | 73/721 |
| 4,261,086 | 4/1981 | Gianchino et al. | 29/25.41 |
| 4,276,533 | 6/1981 | Tominaga et al. | 338/4 |
| 4,287,501 | 9/1981 | Tominaga et al. | 338/42 |
| 4,400,682 | 8/1983 | Ishibashi | 338/4 |
| 4,406,993 | 9/1983 | Kurtz et al. | 338/42 |
| 4,528,855 | 7/1985 | Singh | 73/721 |
| 4,622,856 | 11/1986 | Binder et al. | 73/721 |
| 4,658,651 | 4/1987 | Le | 73/721 |

FOREIGN PATENT DOCUMENTS 3008-441 of 0000 Fed. Rep. of Germany .

OTHER PUBLICATIONS

FIG. 4 of Article "Sensor ICs: Processing, Materials Open Factory Door," *Electronic Design*, Apr. 18, 1985, pp. 131-148.

*Primary Examiner*—Donald O. Woodiel
*Attorney, Agent, or Firm*—Kinney & Lange

[57] ABSTRACT

A deflecting diaphragm differential pressure sensor is formed so all electrical elements and connections from external circuitry to the sensor are isolated from the pressure media. The deflecting, pressure sensing diaphragm is made of a semi-conductor material, having piezoresistors disposed on a surface thereof to form strain gages to sense deflection of the diaphragm. The strain gage resistors are media isolated by a layer that overlies the strain gage resistors. All forms of the invention provide environmental protection for the electrical connections for external circuitry, which are subject to corrosion from the pressure media.

25 Claims, 2 Drawing Sheets

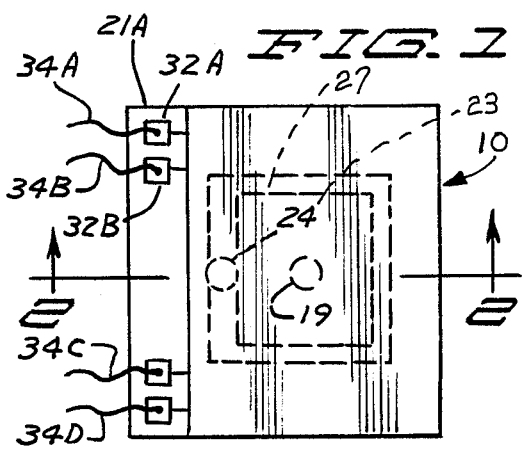
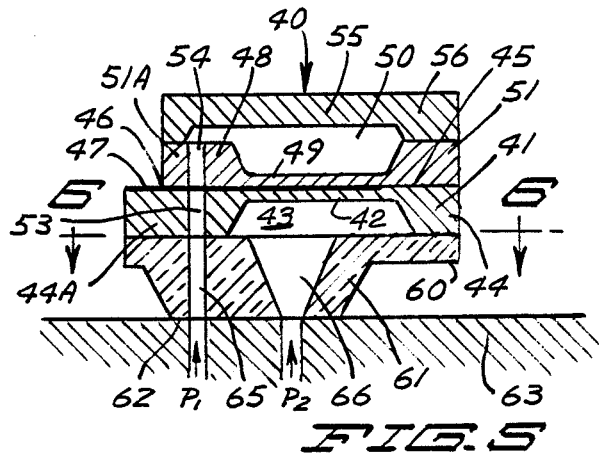
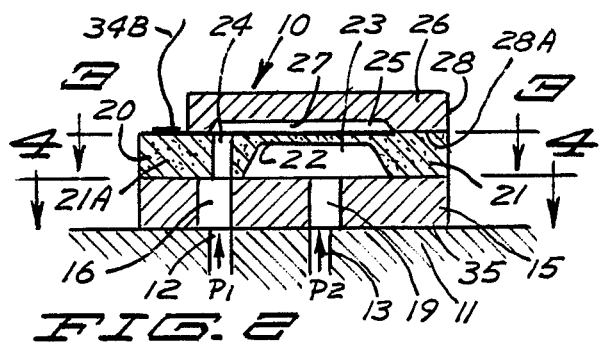
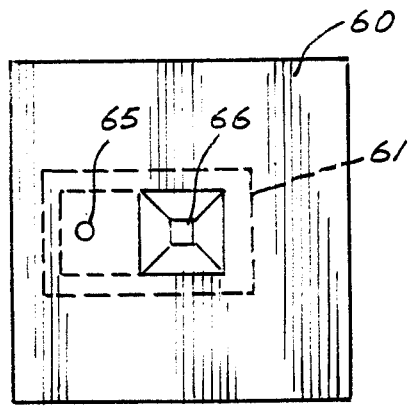
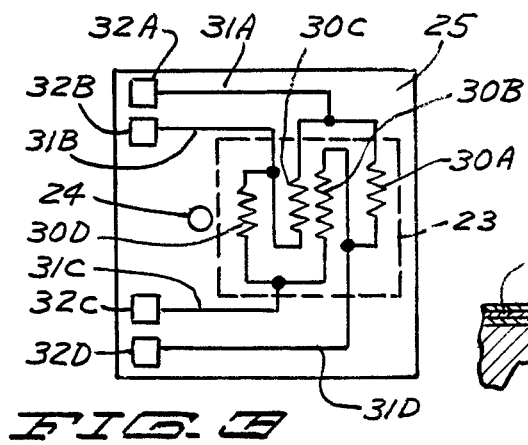
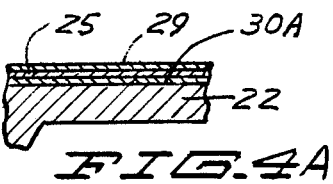
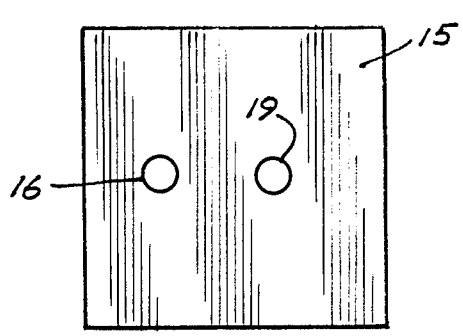
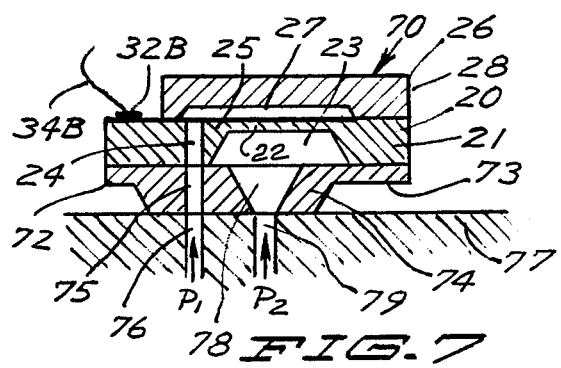

MEDIA ISOLATED DIFFERENTIAL PRESSURE SENSORS

BACKGROUND OF THE INVENTION

1. Field of the Invention

The present invention relates to differential pressure sensors with the transducing or sensing elements and the electrical leads isolated from the sensed pressurized fluids or media, without using separate isolating diaphragms.

2. Description of the Prior Art

Semi-conductor diaphragms that have resistors forming strain gage sensors disposed on the diaphragm surface are used for low-cost, accurate pressure sensors. The pressure media being sensed is usually corrosive, and thus isolating the sensing elements, circuitry, and the electrical connections from direct contact with the pressure media is desireable for reliable operation. Various isolation arrangements have been advanced, but they involve additional costs in construction of isolation sections in sensor housings in which separate isolating diaphragm members are mounted. Additional housings and additional diaphragms in order to obtain isolation increases the expense of manufacture and can reduce the accuracy of the sensor. An example of a miniature pressure transducer that uses a silicon diaphragm, with a silicon cover for absolute pressure measurements, and having a piezoresistive bridge formed by diffusion of resistors on the surface of one side of the diaphragm is shown in U.S. Pat. No. 4,023,562. The present invention discloses means for providing media isolation for sensors of this general type.

SUMMARY OF THE INVENTION

The present invention relates to differential pressure sensors using silicon or other suitable brittle material to form a deflecting diaphragm on which sensor means are disposed, for example by diffusion or thin layer deposition to provide for a strain gage bridge that will measure deflection of the diaphragm with precision. The diaphragm assembly is formed into a pressure sensing cell that is easily mounted, and provides isolation for the sensing and electrical conductors on the sensor from direct contact with the pressure media. The protection for the sensing means and conductors in the diaphragm layer can be achieved by providing a passivating (inert) layer over the sensing means and conductors, or actually forming the diaphragm in two sections or layers, one comprising an overlying protective layer on the surface of the diaphragm carrying the sensing means.

Additionally, the present invention provides media isolation for the electrical bond wires and contact pads, even when the pressurized fluids are both admitted from one side of the pressure sensing cell. The arrangement permits the pressure sensing cell to have a planar mounting surface, with coplanar pressure ports, so that the sensor cell can be hard mounted or resiliently mounted onto a mounting base or surface.

Stress isolation mountings also can be used with the present pressure sensing cell so that strains on the mounting surface are not transmitted to the sensing diaphragm to cause false output signals.

BRIEF DESCRIPTION OF THE DRAWINGS

FIG. 1 is a top plan view of a differential pressure sensor made according to the present invention;

FIG. 2 is a sectional view taken as on line 2—2 in FIG. 1;

FIG. 3 is a sectional view showing a surface of one diaphragm layer having piezoresistive strain gages and electrical contact pads thereon and taken as on line 3—3 in FIG. 2;

FIG. 4 is a view taken as on line 4—4 in FIG. 2;

FIG. 4A is a fragmentary enlarged sectional view of a portion of a diaphragm member to show a passivating layer overlying the strain gage resistors on the diaphragm member;

FIG. 5 is a sectional view of a modified sensor cell made according to the present invention;

FIG. 6 is a view taken along line 6—6 in FIG. 5;

FIG. 7 is a sectional view through the center of a pressure sensing cell made according to a further modified form of the present invention;

DETAILED DESCRIPTION OF THE PREFERRED EMBODIMENTS

Figure 8:
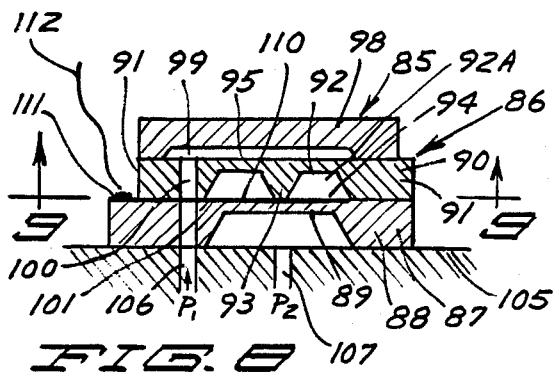
FIG. 8 is a sectional view through the center of a pressure sensing cell having a pair of diaphragm members and made according to the present invention.

A pressure sensing cell indicated generally at 10 in FIGS. 1 and 2 is mounted onto a housing member shown fragmentarily at 11, having a first input port 12 and a second input port 13 each of which carries a separate fluid at pressures $P_1$ and $P_2$, respectively. The differential between pressures $P_1$ and $P_2$ is to be sensed. The sensing cell 10 includes a base 15 made of rigid material such as glass or silicon, and the base 15 has passageways 16 and 19, respectively, therethrough for aligning with the ports or passageways 12 and 13, respectively.

The sensing cell 10 further includes a diaphragm assembly 20 which, as shown, has a rim 21, and a thinner center deflecting diaphragm member 22 formed by etching or otherwise forming a recess or chamber 23. The rim 21 has a side 21A that is of greater lateral width than the other, and a passageway 24 passes through this rim to a surface 25 of the diaphragm. A cover member 26 is etched to have a small recess 27 therein which overlies the surface 25 in the region of the deflecting diaphragm member 22 and forms a chamber. The surface 25 of FIG. 3, as can be seen, has piezoresistive elements 30A–30D disposed thereon which form a strain gage bridge. Electrical conductors indicated at 31A–31D are disposed on the surface 25 (see FIG. 3)

and lead to bonding or contact pads 32A-32D that are positioned on one side of the surface 25, overlying a portion of the side 21A of rim 21. The cavity or chamber 23 is outlined in dashed lines in FIG. 3 for illustrative purposes.

Cover member 26 thus has a rim portion 28 that has a peripheral surface 28A that is bonded (preferably by frit sealing) to the surface 25 along a line surrounding the piezoresistive strain gage elements 30A-30D. The bonding of surface 28A hermetically seals the chamber 27 from the exterior, including sealing the rim surface 28A to surface 25 and across the leads 31A-31D on the side 21A of the rim 21 adjacent the contact or bonding pads 32A-32D.

The resistors 30A-30D, the leads 31A-31D and the bonding pads 32A-32D can be formed in known ways, for example, by diffusing or disposing them into the upper layer of the diaphragm member 22 and rim 21, or by vapor deposition or sputtering, if desired. The pads 32A-32D are raised to permit welding on external bonding wires indicated at 34A-34D (FIG. 1).

Thus, the pressure sensing cell 10, using the mounting layer 15, has coplanar pressure input ports defined by passageways 16 and 19 that lead to the respective chambers 23 and 27. The surface 35 is a planar surface that is convenient for mounting the sensor. The fluid media is present in the chambers 23 and 27, but it is isolated from the metallic bonding or contact pads 32A-32D and leads 34A-34D, respectively.

A passivating layer of inert material which is indicated only by a thicker line on the surface 25 in FIG. 2, but which is illustrated in exaggerated scale at 29 in FIG. 4A, is formed within the chamber 27 and is applied over the surface 25 to protect the piezoresistive strain gage elements 30A-30D from corrosive fluids which are being sensed. The passivating layer can be made up of several thin layers of material deposited in sequence as illustrated, but the first layer on surface 25 has to be an insulating layer so that the strain gage resistors, such as resistor 30A which is represented as being diffused in the upper portion of diaphragm 22, are not shorted out by any subsequent metallic layer. The deposition layers can be Parylene coating, gold, chromium, polysilicon, silicon nitride, silicon dioxide, or combinations of these materials. Again, the selection of the passivating layer material depends on the types of contaminants anticipated in the pressure media represented by $P_1$ for a particular application.

The passivating layer 29, which can be formed of multiple individual layers of material, as shown in FIG. 4A, can be applied in a batch process where several diaphragm members 22 are formed on a single silicon (or other material) wafer. The diaphragm members 22 are formed by etching cavities 23. When using the passivating materials listed, (except Parylene coating) the regions on surface 25 to be free of the passivating layer (the contact pads) can be masked. The layer material is then deposited in the unmasked regions of surface 25. The rim surface 28A is bonded on top of the deposited layer so the sensing components are sealed from the pressure media. The bond of the passivating layer 29 to the surface 25 is strengthened by the bond to surface 28A, and is strong enough to insure adequate integrity under pressure. A preferred material for the passivating layer is undoped polysilicon, which is an insulator.

When Parylene coating is used as a passivating layer, the entire cell 10 is formed as shown before. The isolating, passivating layer is added after the individual cells are formed, and after bonding rim 28 in place. The diffusion of the parylene is carried out in a known manner through passageways 16 and 24. The entire inner surface of chamber 27 is thus coated and protected by the Parylene coating layer.

A completely isolated sensor is provided. That is, the pressure media does not contact the electrical sensing components or conductors which couple the sensor output to circuiting spaced away from the sensor.

FIG. 4 illustrates the base layer 15, which may be glass or silicon. Preferably the layers 20 and 26 are made of similar materials, such as silicon. Other brittle materials can be used for these layers. It can be seen in FIG. 2 that differentials in pressure on the deflecting diaphragm member 22 will cause deflection of the diaphragm, which will result in change in the resistance of the strain gage resistors 30A-30D when a suitable excitation voltage is applied to contacts 32B and 32D. Such change in resistance will provide an output from the bridge formed by the strain gage resistors at the contact pads 32A and 30C.

The contact pads and attached wires are isolated from the pressure media completely, and thus any deleterious effects of the pressure media are avoided at the contact pads and bond wires where corrosion can be very detrimental. The isolation of the pads and wires is through a relatively thick layer of the silicon defined by the rim 28 of the cover layer 26, and thus there is a substantial surface area of bonding material that seals the pressure media from these contact pads and wires. The passivating layer 29, if it extends over the region of contact pads 32A-32D, can be etched or abraded away for attaching wires or leads 34A-34C.

Additionally, the pressure input ports for the differential pressure sensor are coplanar along a planar mounting surface 35. Surface 35 supports the layer 15 onto the housing or other support 11.

The pressure sensing cell 10 can be made in batch processing by having the diaphragm layer 21 in the form of a wafer as stated, and also the cover 26 can be in the form of a wafer and then etching the recesses, forming the holes, adding the resistors and leads, adding the passivating layer and then bonding them together in a batch process so that many of the cells can be formed at one time. The layer 15 is added as a disc or layer of glass, silicon or other material and the rims 21 are bonded in place on layer 15.

In batch processing, the layer forming cover 26 is constructed so that the material immediately above the contact pads 32A-32D is cut away. The layer forming cover 26 can have a saw-cut, or may be etched so that the two layers do not bond to the rim portion 21A that is carrying the contact pads, and then the piece of the cover over the contact pads can easily be separated out when the individual sensor cells are separated. The holes used can either be etched or laser drilled during the manufacturing process.

A modified form of the present invention is shown in FIGS. 5 and 6. FIG. 5 is a cross section of a pressure sensing cell 40. In pressure sensing cell 40, a differential pressure is again measured, and a first diaphragm layer 41 is formed to have a deflecting diaphragm member 42 thereon by etching out a chamber 43, leaving a rim 44, including a wider rim portion 44A corresponding to the portion 21A in the first form of the invention. The diaphragm member 42 is thus edge supported with the rim 44 that surrounds the diaphragm member, and the chamber 43 is generally rectangular in shape.

The diaphragm layer 41 has piezoresistive strain gages disposed on a surface indicated at 45, and these may be diffused as previously explained. The surface 45 also carries conductors leading to contact pads 46, to which bond wires 47 are attached. In this form of the invention, a second isolating, sealing diaphragm layer 48 is provided. The layer 48 overlies the surface 45, and has a very thin center layer 49 formed therein by etching a cavity or chamber 50 to leave a rim 51 around the periphery. The rim 51 has a portion 51A which is not as wide as the portion 44A to leave a region in which the contact pads 46 are exposed to the exterior. Rim 51A leaves the bonding or contact pads exposed in the same manner as that shown in FIG. 1.

The rim portion 44A has a passageway 53 therethrough, which aligns with a passageway 54 defined in the rim portion 51A. A cover member 55 is provided over the second diaphragm layer 51 to enclose chamber 50. Cover member 55 has a very shallow recess in the center portion, forming a rim 56 that is bonded and sealed to the rim 51 around its periphery. The rim 56 is formed so that it does not cover the passageway 54. Thus, the passageway 54 opens into the chamber 50, so that pressure provided through the passageways 53 and 54 will act on the upper surface (as shown) of the thin diaphragm 49 of the second diaphragm layer 51.

The lower surface of rim 44 is bonded onto a rigid base layer 60, which can be glass or silicon, and which, in this form of the invention, is etched prior to bonding to the first diaphragm layer 41 to form a support or mounting boss 61 on a side thereof opposite from the first diaphragm layer 41. The mounting boss 61 provides a mounting surface 62 that can be supported onto a housing 63. Mounting surface 62 is smaller size than the diaphragm layer 41 to tend to isolate stresses induced from the housing 63. Stresses in the housing or mounting member 63 will tend to stress the diaphragm member 42 from loads or strains in the housing 63 and cause incorrect outputs.

A passageway 65 is defined in the boss portion 61 in alignment with the passageways 53 and 54, so that a fluid under pressure being admitted through the housing 63 and indicated at $P_1$ will be applied to the chamber 50 and will act on the isolating layer 49 that overlies the sensor elements on the upper side of the diaphragm member 42.

The boss 61 also has a passageway 66 that is open to a source of fluid under pressure $P_2$ from the housing 63. The pressure $P_2$ acts in the enclosed chamber 43, on the underside of the diaphragm member 42.

It should be noted that the isolating layer 49, which is silicon also, is substantially thinner than the diaphragm section 42 so that the strain gage members comprising the resistors on the surface 45 are not on a strain-neutral axis of the resulting assembly of the bonded on isolating layer 49 and diaphragm member 42.

The diaphragm layer 41 and isolating layer 51 are firmly and completely fused or bonded together at the surface 45 so they deflect together. The layer 51 serves as the pressure media isolation layer in that the bonding to the surface 45 forms a barrier so that fluid in chamber 50 does not come in contact with the contact pads 46 or the lead or bond wires 47.

In FIG. 6, a view of the base layer 60 is shown, and indicates the shape of the opening 66, which is etched as shown. The opening 65 can be a laser drilled hole. It can be seen that the boss member 61 is substantially smaller than the periphery or edge portions of the base layer 60, so that the rim 44 of the diaphragm layer that is bonded onto the base layer 60 is supported primarily on thinner sections of the base layer. This helps in stress isolation to prevent transfer of stress from the mounting surface of housing 63 to the sensing diaphragm member 42.

FIG. 7 illustrates a form of the invention that is similar to that shown in FIG. 2, except that the base layer is formed with a boss for stress isolation purposes. The sensing cell 70 in FIG. 7 comprises a diaphragm layer 20 (the same as FIG. 2) having a deflecting diaphragm portion 22, with the strain gage resistors 30A-30D diffused on surface 25 as previously described. The rim 21 supports the deflecting diaphragm 25. The layer 26 has a rim 28 bonded to surface 25 for isolating the contact pads shown at 32B and the wires shown at 34B in FIG. 7 from the pressure media supplying the pressure $P_1$ through the opening 24 in the rim portion 21 of the diaphragm member. In this instance, however, the base layer 15 is replaced with a base layer 72 which has a thin peripheral portion or ledge 73, and a support boss 74. The boss 74 is of smaller size than the periphery of layer 72, and is similar to the boss shown in FIG. 5. Boss 74 has a passageway 75 thereon aligning with the passageway 24, and leading from a pressure source $P_1$ acting through a passageway 76 in a housing mounting 77 to provide a pressure to the cavity 27 formed by the isolation layer 26.

The boss 74 also has a pressure passageway 78 that aligns with an opening 79 in the housing 77 and provides pressure $P_2$ from a source of fluid under pressure through the openings 78 and 79 to the chamber 23 underneath the deflecting diaphragm 22.

In this form of the invention the same isolation features are achieved as previously explained, by having a passivating layer over the strain gage resistors 30A-30D. The boss 74 provides for stress isolation in the same manner as the boss 61 in FIG. 5. The diaphragm rim 21 is bonded to the portions 73 of the base layer 72 that are thinner in section to provide this stress isolation.

FIG. 8 shows a further modified pressure sensing cell indicated at 85. Cell 85 has a two layer diaphragm assembly 86. The layers of assembly 86 are made from silicon as before. The sensing diaphragm layer 87 has a peripheral rim 88 surrounding a central deflecting diaphragm member 89. A second isolating and sealing layer 90 has a rim portion 91 substantially overlying or in registry with the rim 87, and has a central thinner deflecting member 92. In this form of the invention, the second isolating layer has chamber 92A forming the deflecting member 92, which has an integral central boss 93 that has a surface engaging a surface 94 on the deflecting diaphragm member 89, so that pressure acting on the upper surface 95 of deflecting member 92 of the isolating layer will cause deflection not only of deflecting member 92, but also diaphragm member 89. The motion of one deflecting member will be transmitted to the other by the boss 93. Pressure acting on the under surface of the diaphragm member 89 will also cause deflection of the deflecting isolating member 92 as well.

A cover member 98 is provided over the surface 95 of the isolating layer. The cover 98 has a shallow recess therein to form a closed chamber 99. The chamber 99 is of size to overlie a pressure passageway 100 defined in one section of the rim 91 of the isolating layer 90. Passageway 100 aligns with another passageway 101 in the underlying section of rim 88 of diaphragm layer 87.

As shown, the diaphragm layer 87 has a mounting surface supported on a housing 105. Housing 105 has a pressure passageway or opening 106 leading from a pressure source $P_1$. Pressure passageway 106 aligns with passageways 101 and 100 so that pressure $P_1$ will be admitted to the chamber 99 and will act on the surface 95 of the diaphragm layer 90.

The housing 105 further has a pressure passageway 107 that opens to a cavity formed under the sensing diaphragm member 89 of the diaphragm layer 87. Passageway 107 is open to a pressure source $P_2$.

The surface 94 of the diaphragm 89 has piezoresistive strain gages 110 disposed thereon, with suitable conductors leading to contact pads 111 mounted on the rim portion 88A. The contact pads 111 are on the exterior of the rim 91 of the isolating layer 90, and thus the contact pads are isolated from the pressure media $P_1$ acting on the isolating layer surface 95. Suitable wires 112 are attached to the bonding or contact pads. The electrical connections are completely isolated from the media. Another feature of this form of the invention is similar to that shown in FIG. 5, in that the piezoresistive strain gages 110 are completely media isolated as well by the isolating layer 90, and the electrical connections for the contact pads and wires are also isolated by being outside of the thick rim 91.

Figure 10:
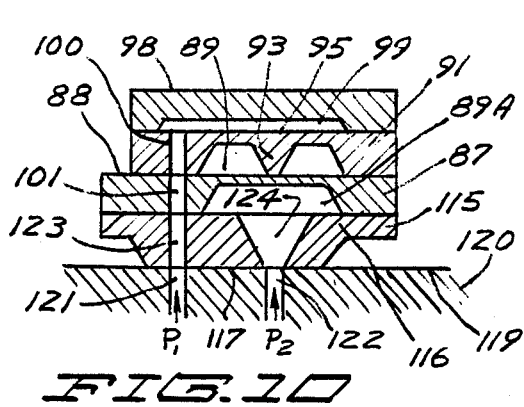
FIG. 10 is a center sectional view of a pressure sensing cell similar to that shown in FIG. 8 but mounted onto a mounting base, and a manifold member providing the differential pressures to be sensed.

FIG. 10 shows a further modified form of the invention disclosing a pressure sensing cell with the diaphragm layer and isolating layer arrangement of FIG. 8 mounted onto a rigid base layer, rather than directly onto a housing 105. The same numbers are shown for the diaphragm layer and isolation layer, and the force coupling boss 93. In this form, the mounting surface 115 under rim 88 for the diaphragm layer 87 is mounted directly onto a rigid material base layer 116 that may be made of glass, silicon or other suitable material. The base layer 116 has a boss section 117 of smaller size than the periphery of the base layer so that there are thinner edge sections 119 that support the rim portion 88 for the diaphragm layer 87.

In this form of the invention, the surface 115 of the diaphragm layer 87 is bonded to the base layer 116. The base layer 116 is in turn mounted on a housing or support 120 that has a pressure passageway 121 for pressure $P_1$ and a passageway 122 for pressure $P_2$. The passageway 121 aligns with a passageway 123 extending through the boss member 117. The passageway 123 aligns with the passageway 101 in the rim 88 and this is open through passageway 100 to chamber 99. The passageway 122 aligns with a passageway 124 in boss member 117 leading to the chamber 89A underneath the deflecting sensing diaphragm member 89. This provides pressure $P_2$ to the surface 95 of the deflecting member 92 which is coupled to sensing diaphragm member 89, to provide deflection as a function of differential in pressure between $P_1$ and $P_2$. The base layer 116 is thus similar in function to the base layer 60 shown in FIG. 5.

Figure 11:
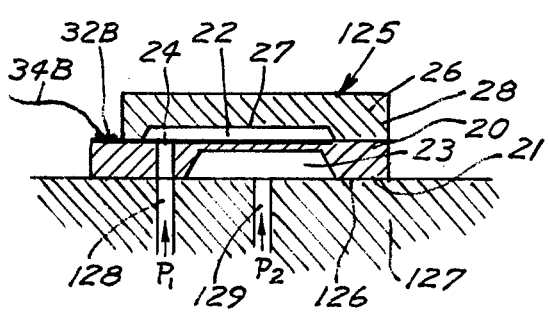
FIG. 11 is a sectional view of a pressure sensing cell having a deflecting diaphragm and cover similar to that shown in FIG. 2, but mounted on a pressure manifold or pressure source.

FIG. 11 shows a further modified form of the invention that is similar to that shown in FIG. 2, except that the diaphragm layer is mounted directly onto a housing. The sensing cell indicated at 125 comprises a diaphragm layer 20, with a cover layer or member 26 forming an enclosed chamber 27 over the isolating layer covering the sensing strain gage resistors. The mounting surface 126 under rim portion 21 of the diaphragm member 20 is bonded or fused directly onto a surface of a housing 127 that has pressure passageways 128 for pressure $P_1$ and 129 for pressure $P_2$. The passageway 128 aligns with the opening or passageway 24 in the rim 21 leading to the chamber 27, and the passageway 129 leads to the chamber 23 formed underneath the deflecting diaphragm member 22. Here, too, the electrical bonding or contact pads 32A-D and the conductors 34A-D are isolated from pressure $P_1$ and from pressure $P_2$ by the isolation rim 2B. The passivating layer is used in chamber 27, as previously explained in connection with FIGS. 2 and 4A.

Figure 12:
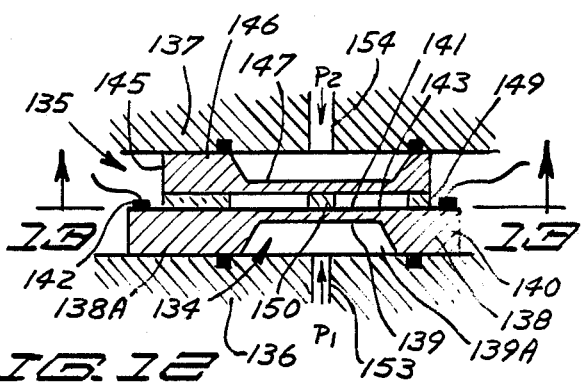
FIG. 12 is a vertical sectional view of a modified form of the invention having an intermediate layer between two diaphragm portions to provide media isolation to strain gage resistors disposed on one of the diaphragms.
Figure 9:
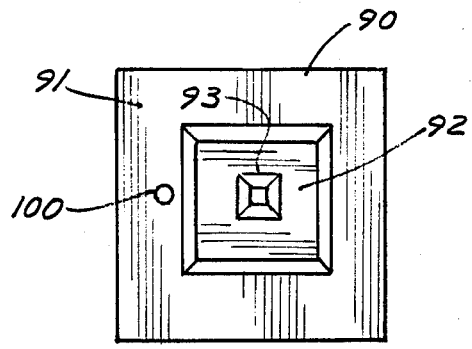
FIG. 9 is a view taken as on line 9—9 in FIG. 8.

FIG. 12 shows a further modified form of the invention, wherein the pressure sensing cell indicated generally at 135 is mounted between two separate housing portions indicated at 136 and 137, respectively. The pressure sensing cell 135 in this form of the invention also provides for media isolation, and includes a diaphragm assembly 134 including a sensing layer 138 that has a deflecting sensing diaphragm member 139 with a rim 140 surrounding the diaphragm member 139 to form a chamber 139A. The deflecting diaphragm member 139 has piezoresistive strain gages 141 disposed on a surface thereof. Electrical conductors extend from the strain gage resistor to bonding or contact pads 142, above a rim portion 138A. The strain gages are disposed on a surface 143 of deflecting diaphragm member 139.

The assembly 134 includes a second isolating, sealing layer 145 that has a rim 146, and a central thin deflecting member 147. An intermediate glass peripheral rim 149, and a glass center block 150 are bonded to both isolation layer 145 and the upper surface of diaphragm layer 138. The peripheral rim 149 and the isolating layer 145 provide isolation for the electrical connection, bonding or contact pads and the diffused strain gage resistors from the pressure media. The central block 150 is bonded to the deflecting isolation member 147 and diaphragm member 139 so motion is transmitted from one deflecting member to the other. The rim 149 and block 150 are part of a single layer of glass that is used in batch processing and the glass layer is removed in the area where it is not needed.

In one method of assembly, the isolating layer 145 is bonded to a glass layer including rim 149 and block 150 before being placed onto the diaphragm layer 138. The glass layer can be etched so that the rim 149 and central block 150 are left in place after being bonded onto the isolating layer 145.

The housing 136 has a pressure passageway or opening 153 that leads from pressure source $P_1$ to chamber 139A below the diaphragm member 139. The housing 137 has a pressure passageway or opening 154 that provides pressure $P_2$ from a pressure source to one surface of the isolating deflecting member 147 on a side thereof opposite from the sensing strain gage 141. The electrical connections and the strain gage resistors are isolated from the pressure media.

Figure 13:
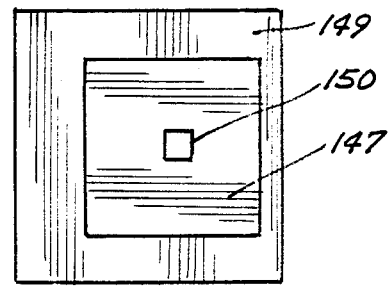
FIG. 13 is a view taken as on line 13—13 in FIG. 12.

The shape of the glass rim 149 and central block 150 is shown in FIG. 13. The deflecting member 147 and diaphragm member 138 are bonded so they deflect as a unit. The deflection is sensed by using the strain gages diffused onto the isolated surface 143 of the one diaphragm member.

Figure 14:
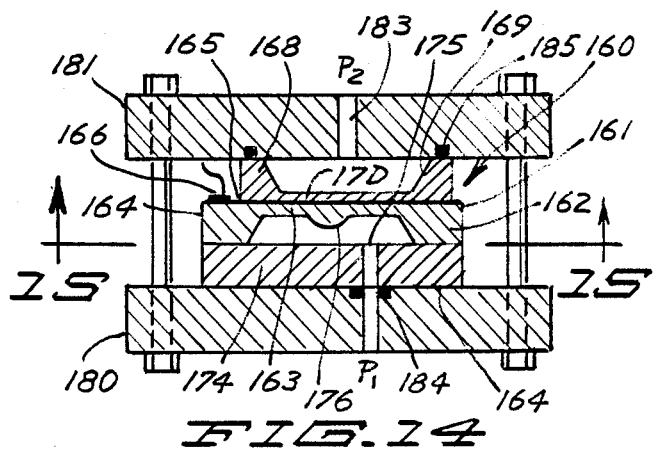
FIG. 14 is a vertical sectional view of a further modified pressure sensing cell made according to the present invention mounted in an outer housing member.
Figure 15:
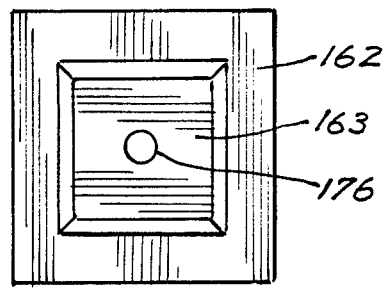
FIG. 15 is a sectional view taken as on line 15—15 in FIG. 14 with parts removed for sake of clarity.

FIGS. 14 and 15 show a further modified form of the invention wherein the pressure sensing cell 160 comprises a diaphragm assembly 161 including a first diaphragm layer 162 having a central deflecting diaphragm member 163 and a peripheral support rim 164 thereon. The central deflecting diaphragm member 163 has a surface 165 on which strain gages and leads are disposed as previously explained, and bonding or contact pads 166 are mounted near an edge thereof. The diaphragm assembly 161 includes an isolating layer 168 having a rim 169 and a very thin center deflecting member 170 that overlies and is bonded to the deflecting member 163 of diaphragm layer 162. The deflecting portion 170 isolates the sensing strain gage from the pressure media and deflects with the diaphragm member.

The outer surface of the rim 162 of diaphragm layer 161 in turn is bonded onto a base layer 174, and the base layer 174 is provided with a pressure passageway 175 which is offset from the center of the chamber formed by the rim 164. It can be seen that the deflecting diaphragm member 163 has a overpressure stop member 176 formed thereon facing the base layer 174.

The sensor cell 160 is clamped between two housing sections 180 and 181, which have passageways 182 and 183, respectively for carrying pressures $P_1$ and $P_2$. Suitable O rings 184 are used for sealing the openings to these passageways with respect to the base layer 174. "O" rings 185 are used for sealing the rim 168 with respect to the housing member 181.

The diaphragm section 170 is of substantially different thickness than diaphragm section 163, so the strain gages on the surface of diaphragm members 163 are not on the neutral axis of the assembly of the isolating layer and sensing diaphragm member. The strain gages thus provide an output indicating the amount of deflection of the diaphragm assembly. The deflection of the diaphragm is caused by differentials in pressures $P_1$ and $P_2$.

In all forms of the invention, the electrical elements are isolated from the pressure media by layers of solid material so the pressure media acts directly on the diaphragm without an intervening isolating diaphragm that in turn moves a non-compressible fluid against the sensing diaphragm. Simplicity of construction is achieved, and isolation from the pressure media is also accomplished while permitting batch fabrication techniques to be used.

Although the present invention has been described with reference to preferred embodiments, workers skilled in the art will recognize that changes may be made in form and detail without departing from the spirit and scope of the invention.

While resistive strain gauge sensors have been shown in the preferred embodiments, other sensing means such as capacitive sensors can be disposed on the diaphragm. Titanium dioxide or other metal oxides can also be used as passivating layers. A ductile metal foil can also be used as a passivating layer.

What is claimed is:

1. A media-isolated pressure sensor for coupling to first and second fluids and for providing an output respresentative of a differential pressure between the fluids, comprising:

diaphragm means coupled to the fluids for sensing the pressure having a fixed rim surrounding a diaphragm deflecting responsive to the pressure, and having sensing means disposed in a first surface of the diaphragm for sensing the deflection and providing the output, the diaphragm isolating the sensing means from contact with the first fluid;

isolating means disposed on the first surface and extending to the rim for isolating the sensing means from contact with the second fluid;

connection means coupled to the sensing means for electrically coupling the output to a location spaced away from the sensor; and chamber means having a chamber wall sealingly affixed to the rim for containing the second fluid and having a first passageway therethrough for coupling the second fluid to the isolating means, the connection means extending under the chamber wall to the location spaced away from the sensor such that the connection means are isolated from contact with both the first and second fluids.

2. The sensor of claim 1 wherein the diaphragm means is formed in a layer of brittle material.

3. The sensor of claim 2 wherein the chamber means is formed in a layer of silicon.

4. The sensor of claim 2 wherein the chamber means is formed in a layer of brittle material.

5. A media-isolated pressure sensor for coupling to fluid under pressure and for providing an output representative of the pressure, comprising:

diaphragm means formed of a layer of brittle coupled to the fluid for sensing the pressure having a fixed rim surrounding a diaphragm deflecting responsive to the pressure, and having sensing means disposed in a first surface of the diaphragm for sensing the deflection and providing the output;

isolating means disposed on the first surface and extending to the rim for isolating the sensing means from contact with the fluid;

connection means extending over a portion of the first surface and coupled to the sensing means for electrically coupling the output to a location spaced away from the sensor, said isolating means isolating the connection means from contact with the fluid;

chamber means formed in a layer of brittle material which is sealingly affixed to the rim for containing the fluid and having a first passageway therethrough for coupling the fluid to the isolating means and for isolating the connection means from contact with the fluid;

the diaphragm means having a second surface opposite the first surface, and the sensed pressure comprising a differential pressure between a first fluid coupled to the first surface and a second fluid coupled to the second surface; and mounting means formed in a third layer of brittle material and having a first mounting surface sealing bonded to the rim and having a second mounting surface spaced away from the first mounting surface for mounting the sensor to a support surface, the mounting means having a second passageway extending from the first mounting surface to the second mounting surface for coupling the second fluid to the second surface of the diaphragm means.

6. The sensor of claim 5 wherein the diaphragm comprises a centrally positioned protrusion contacting the mounting means under overpressure conditions.

7. The sensor of claim 5 wherein the rim has a third passageway therethrough spaced away from the connection means for coupling the first fluid to the chamber means.

8. The sensor of claim 5 wherein the rim has a third passageway therethrough and the mounting means has a fourth passageway therethrough spaced away from the second passageway and coupled to the third passageway for coupling the first fluid to the first passageway.

9. The sensor of claim 8 wherein the isolating means comprises a layer of brittle material.

10. A media isolated pressure sensor for sensing a differential pressure between two fluid sources comprising:
- a deflecting diaphragm having oppositely facing surfaces coupled to the fluids;
- a diaphragm rim integral with the deflecting diaphragm for supporting the deflecting diaphragm at its edge and extending outwardly on one side of the deflecting diaphragm;
- sensing means on said deflecting diaphragm on a first side thereof which is opposite from said rim for sensing the deflection of the deflecting diaphragm, said first side comprising a surface extending over said rim, said sensing means including electrical lead means extending along the surface to overlie a portion of the rim, said diaphragm isolating the sensing means from contact with the first fluid;
- means defining a chamber overlying at least the one side of the deflecting diaphragm so pressure in such chamber tends to deflect the diaphragm, said chamber being sealed along a periphery adjacent the rim, the portion of said lead means that extend to overlie the rim being beyond the periphery of the means defining a chamber on the side of the diaphragm having the lead means so the outer ends of the lead means are isolated from the chamber defined;
- means forming an isolation sealing layer overlying and sealing said sensing means and covering the entire surface of the diaphragm subject to pressure from the chamber, said isolation layer being deflectable with the diaphragm in response to pressure in the chamber; and
- mounting means affixed to the rim for mounting the sensor to the sources of fluid such that the sensing means and the lead means including the outer ends of the lead means are isolated from contact with both the first and second fluids.

11. The pressure sensor of claim 10 further characterized by said isolation layer being bonded to the first side of the diaphragm across a substantial portion thereof.

12. A media isolated pressure sensor comprising:
- a deflecting diaphragm having oppositely facing surfaces;
- a diaphragm rim integral with the deflecting diaphragm for supporting the deflecting diaphragm at its edge and extending outwardly on a first side of the deflecting diaphragm;
- sensing means on said deflecting diaphragm on a second side thereof which is opposite from said rim for sensing the deflection of the deflecting diaphragm, said second side comprising a second surface extending over said rim, said sensing means including electrical lead means extending along the second surface to overlie a portion of the rim;
- means defining a chamber overlying at least the first side of the deflecting diaphragm so pressure in such chamber tends to deflect the diaphragm, said chamber being sealed along a periphery adjacent the rim, the portions of said lead means that extend to overlie the rim being beyond the periphery of the means defining a chamber on the side of the diaphragm having the lead means so the outer ends of the lead means are isolated from the chamber defined; and
- means forming an isolation sealing layer overlying and sealing said sensing means and being bonded to a substantial portion of the second side of the diaphragm and covering substantially the entire surface subject to pressure from the chamber, said isolation layer being deflectable with the diaphragm in response to pressure in the chamber and having a second integral rim extending in a direction away from the deflecting diaphragm, said second rim defining a portion of the chamber.

13. The pressure sensor of claim 12 and separate housing members sealingly engaging outer edges of the second rim and diaphragm rim to form the first mentioned chamber and a second chamber, said housing member including means to introduce fluid under pressure to the chambers.

14. A media isolated pressure sensor comprising:
- a deflecting diaphragm having oppositely facing surfaces;
- a diaphragm rim integral with the deflecting diaphragm for supporting the deflecting diaphragm at its edge and extending outwardly on a first side of the deflecting diaphragm;
- sensing means on said deflecting diaphragm on a second side thereof which is opposite from said rim for sensing the deflection of the deflecting diaphragm, said second side comprising a second surface extending over said rim, said sensing means including electrical lead means extending along the second surface to overlie a portion of the rim;
- means defining a chamber overlying at least the first side of the deflecting diaphragm so pressure in such chamber tends to deflect the diaphragm, said chamber being sealed along a periphery adjacent the rim, the portions of said lead means that extend to overlie the rim being beyond the periphery of the means defining a chamber on the side of the diaphragm having the lead means so the outer ends of the lead means are isolated from the chamber defined;
- means forming an isolation sealing layer overlying and sealing sais sensing means and being bonded to a substantial portion of the second side of the diaphragm and covering substantially the entire surface subject to pressure from the chamber, said isolation layer being deflectable with the diaphragm in response to pressure in the chamber; and
- a base layer made of rigid material mounted on the diaphragm rim on an opposite side of said diaphragm from said isolation layer, said base layer being bonded to the diaphragm rim and having a boss of smaller size than the periphery of the base layer extending outwardly from the surface of the base layer opposite from the deflecting diaphragm, the base layer having a thin portion surrounding the boss the diaphragm rim being supported on the thin portion, said boss having a mounting surface on the outwardly extending side thereof for mounting the base layer.

15. The differential pressure sensor of claim 14 and means on a surface of said diaphragm opposite from the first surface providing a mechanical stop engagable with said base layer when the diaphragm is subjected to overpressure.

16. A differential pressure sensor comprising:
- a deflecting diaphragm having first and second surfaces;
- a first rim member supporting the deflecting diaphragm at its edge and extending outwardly from a side of the diaphragm;

strain gage means on one surface of said diaphragm for sensing the deflection of the diaphragm;

lead means formed on said one surface for connecting the strain gage means to external circuitry, said lead means extending laterally of the deflecting diaphragm to overlie the rim;

isolation layer means overlying said strain gage means and lead means in the region of the deflecting diaphragm to seal the strain gage means and lead means;

at least one cover member forming a chamber on an opposite side of the isolation layer means from the strain gage and leads, said cover member having a second rim surrounding the chamber and being sealingly bonded with respect to the one surface along a peripheral line smaller than the periphery of the first rim member of the deflecting diaphragm so the leads extend outwardly beyond the cover member; and pressure supply means to provide a pressure to be measured to the chamber and to act on the opposite surface of said deflecting diaphragm from the one surface.

17. The differential pressure sensor of claim 16 further characterized by said isolation layer being bonded to the one surface across a substantial portion thereof.

18. The differential pressure sensor of claim 17 wherein said isolation layer and said second rim are a unitary body, said isolation layer means comprising a thin section layer that moves with the deflecting diaphragm.

19. The differential pressure sensor of claim 16 wherein said pressure supply means comprises two passageways, both of said passageways opening to the same external surface of the differential pressure sensor.

20. The differential pressure sensor of claim 19 wherein said base layer is made of a rigid material, and a boss of smaller size than the periphery of the base layer extending outwardly from the surface of the base layer opposite from the deflecting diaphragm, the first rim thereby being supported on a thin portion of the base layer, said boss having a mounting surface on the outwardly extending side thereof for mounting the base layer.

21. The differential pressure sensor as specified in claim 16 and a base layer mounted on the first rim on an opposite side of said diaphragm from said isolation layer, said base layer being bonded to the first rim, and at least one pressure supply means comprising a passageway in said base layer.

22. The differential pressure sensor of claim 21 wherein said pressure supply means comprise passageways defined to extend through the boss.

23. The differential pressure sensor of claim 16 wherein said isolation layer is spaced from the diaphragm by a third peripheral rim to form a cavity over the strain gage means on the deflecting diaphragm.

24. The differential pressure sensor of claim 23 and a central boss integral with the isolation layer and coupled to the diaphragm member to cause simultaneous deflection of the isolation layer and the deflecting diaphragm.

25. A media-isolated pressure sensor for coupling to fluid under pressure and for providing an output representative of the pressure, comprising:

diaphragm means formed of a layer of silicon coupled to the fluid for sensing the pressure having a fixed rim surrounding a diaphragm deflecting responsive to the pressure, and having sensing means disposed in a first surface of the diaphragm for sensing the deflection and providing the output;

isolating means disposed on the first surface and extending to the rim for isolating the sensing means from contact with the fluid;

connection means coupled to the sensing means for electrically coupling the output to a location spaced away from the sensor; and chamber means sealingly affixed to the rim for containing the fluid and having a first passageway therethrough for coupling the fluid to the isolating means and for isolating the connection means from contact with the fluid.

* * * * *

UNITED STATES PATENT AND TRADEMARK OFFICE
CERTIFICATE OF CORRECTION

PATENT NO. : 4,773,269

DATED : September 27, 1988

INVENTOR(S) : Thomas A. Knecht et al.

It is certified that error appears in the above-identified patent and that said Letters Patent is hereby corrected as shown below:

Column 8, line 7, after "rim", delete "2B" and insert --28--;

line 38, delete "area" and insert --areas--.

Column 9, lines 53-54, delete "respresentative" and insert --representative--.

Signed and Sealed this

Eleventh Day of April, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,773,269

DATED : September 27, 1988

INVENTOR(S) : Thomas A. Knecht et al.

It is certified that error appears in the above-identified patent and that said Letters Patent is hereby corrected as shown below:

Column 8, line 7, after "rim", delete "2B" and insert --28--;

line 38, delete "area" and insert --areas--.

Column 9, line 13, after "has", delete "a" and insert --an--;

lines 53-54, delete "respresentative" and insert --representative--.

Column 10, line 18, after "brittle", insert --material--.

Column 12, line 39, delete "sais" and insert --said--.

This certificate supersedes Certificate of Correction issued April 11, 1989.

Signed and Sealed this

Twenty-first Day of November, 1989

Attest:

JEFFREY M. SAMUELS

Attesting Officer    Acting Commissioner of Patents and Trademarks